United States Patent [19]  
West et al.

[11] 4,369,231  
[45] * Jan. 18, 1983

[54] METHOD OF APPLICATION, AND PRODUCT THEREOF

[75] Inventors: George C. West, Concord, N.C.; William F. Polfus, Mercedes, Tex.

[73] Assignee: Reeves Brothers, Inc., New York, N.Y.

[*] Notice: The portion of the term of this patent subsequent to Sep. 1, 1998, has been disclaimed.

[21] Appl. No.: 289,909

[22] Filed: Aug. 4, 1981

Related U.S. Application Data

[63] Continuation of Ser. No. 133,557, Mar. 24, 1980, Pat. No. 4,287,261, which is a continuation of Ser. No. 945,589, Sep. 25, 1978, abandoned.

[51] Int. Cl.³ .......................... B05D 3/02; B32B 9/04
[52] U.S. Cl. .................................. 428/421; 427/209; 427/358; 427/369; 427/387; 427/389; 427/393.4; 427/412; 427/428; 428/266; 428/447
[58] Field of Search ............... 427/176, 209, 369, 428, 427/371, 358, 387, 389, 393.4, 412, 428; 428/267, 421, 266, 246, 252, 447

[56] References Cited

U.S. PATENT DOCUMENTS 3,418,162 12/1968 Adachi ............................. 117/161
4,007,305 2/1977 Isakar et al. ...................... 427/322

Primary Examiner—Bernard D. Pianalto  
Attorney, Agent, or Firm—Pennie & Edmonds

[57] ABSTRACT

The present invention relates to a unique chemical formulation used in the manufacture of substantially wind-resistant, water-repellent fabrics. The formulation comprises a silicone polymer catalyzed with a tin compound and optionally includes acetic acid and an aromatic solvent.

A method for treating fabrics includes depositing the unique formulation on a taut fabric, uniformly distributing it across the width of the fabric and curing that product. Either before or after that treatment, the fabric is padded with or dipped in a bath of silicone or hydrofluorocarbon. Excess solution is removed. Last, the multicoated fibers of the fabric are compressively shrunk. A substantially wind and water-resistant fabric is produced that is not only porous and soft but also durable.

15 Claims, No Drawings

METHOD OF APPLICATION, AND PRODUCT THEREOF

CROSS REFERENCE TO RELATED APPLICATION

This application is a continuation of application Ser. No. 133,557, filed Mar. 24, 1980, U.S. Pat. No. 4,287,261, which application in turn is a continuation of application Ser. No. 945,589, filed Sept. 25, 1978 and now abandoned.

TECHNICAL FIELD

The present invention relates to rainwear products which have superior durability, breathability and "handle". Notably, these products are substantially wind-resistant and water-repellent.

BACKGROUND ART

Generally, water-repellency and wind-resistance depend upon the characteristics of a fabric and the fiber from which it is constructed. Unbleached cotton and linen fabrics have inherent water-repellency because natural waxes are present. But, scoured and bleached cotton and linen fabrics, as well as rayon fabrics, are hydrophilic; that is, absorb water. Wool has some initial repellency, but it eventually absorbs water.

A synthetic fiber may resist water absorption, and yet fabrics composed of that fiber can be thoroughly wetted by water. What occurs is that water coating the surface of each fiber fills voids between fibers of the fabric. Because a fiber is hydrophobic, does not mean that fabrics made from them are water-repellent. In fact, voids which lie between fibers can act like capillaries to enhance the spreading and wicking of water. Consequently, fabrics are generally treated with special finishes to impart desirable characteristics.

Conventional finishes form a coating over the fabric surface. Typical finishes comprise paraffins, natural and synthetic rubber, as well as a variety of resins. Canvas illustrates such coated fabrics. Unfortunately, those finishes increase the weight of the product by approximately 50 to 90 percent. Moreover, the coated product is neither porous, durable nor soft.

Silicone and certain fluorinated polymers are also popular coating materials. However, these coatings are either not durable or not aesthetic. Moreover, both water and wind, for example, in a driving rain, can penetrate fabrics coated with these materials due to the porosity of the fabric and the force at which water and wind contact the fabric.

The present invention discloses a superior formulation, method of application and product thereof which overcomes the disadvantages of the prior art noted above and which is substantially wind-resistant and water-repellent.

DISCLOSURE OF INVENTION

According to the present invention, a unique chemical formulation is disclosed which, when applied to a fabric, results in a product that is substantially wind-resistant and water-repellent. The formulation comprises two critical components, namely, a silicone polymer and a tin catalyst. More specifically, the first component is a poly dimethyl siloxane compound having a concentration between about 93 to about 99% by weight. Siloxane compounds are manufactured by Dow Corning. The second component consists of a tin catalyst like dibutyl tin diacetate or preferably dibutyl tin dilaurate, both of which are manufactured by Dow Corning. The concentration of the tin catalyst should be between about 0.5 to about 1.5% by weight.

Optionally, the formulation includes an acid like glacial acetic acid manufactured by Industrial Chemical and an aromatic solvent like xylol manufactured by Amsco. The optional ingredients perform the function of extending the shelf life of the formulation once the polymer and tin catalyst are mixed. The concentration ranges for the acid and solvent are 0.0 to about 1.5% by weight and 0.0 to about 5.0% by weight, respectively.

A method is also taught for applying the formulation to a substrate such as fabrics used in manufacturing raincoats. The method comprises three basic steps. One step includes depositing the formulation on a substrate, uniformly distributing it across the width of the substrate and curing the product. Another step comprises dipping the substrate in a bath of silicone or fluorocarbon solution and removing excess solution. The other treatment can be performed either before or after the first mentioned step. The last step comprises compressing the multicoated fibers of the substrate from the first two steps. This results in a product which is superior to those of the prior art. Specifically, the fabric is porous, durable, and has a good handle. More importantly, the product is substantially wind-resistant and water-repellent. Over all, it overcomes the disadvantages of the prior art noted above.

BEST MODE FOR CARRYING OUT THE INVENTION

As previously mentioned, the formulation of the subject invention comprises two critical components as well as two optional components. The formulation listed below, along with the range of concentration for each of the components, is a typical formulation within the purview of the subject invention:

| Component | Concentration Range Percent by Weight |
|---|---|
| Poly Dimethyl Siloxane | 93–99 |
| Tin Catalyst | 0.5–1.5 |
| Acid | 0–1.5 |
| Aromatic Solvent | 0–5.0 |

The preferred formulation is:

| Component | Concentration Percent by Weight |
|---|---|
| Poly Dimethyl Siloxane | 95.3 |
| Dibutyl Tin Dilaurate | 0.7 |
| Acetic Acid | 1.0 |
| Aromatic Solvent | 3.0 |

The poly dimethyl siloxane component is critical to the formulation. A suitable siloxane is manufactured by Dow Corning. Typically, the viscosity of the siloxane is between 20,000 to 40,000 centipoise at 25° C. The silicone content is about 30% by weight.

Regarding the critical tin catalyst component, suitable catalysts are dibutyl tin diacetate, dibutyl tin dilaurate, and dibutyl tin octoate. The tin content of such catalysts are important. Dow Corning manufactures suitable catalyst under the trade names XY 170 (dibutyl tin dilaurate) and XY 176 (dibutyl tin diacetate). The tin content is 8.7% by weight and 33.4% by weight for the respective Dow Corning catalysts. That concentration of tin is contained within the concentration range of 0.5 to 1.5% by weight of the catalyst component.

The two remaining components are optional and function to reduce the viscosity of the formulation. More importantly, they increase the life of the formulation so that it is more suitable for commercial applications. Typically, the acid is acetate acid. Other acids are also suitable. The aromatic solvent is typically xylol. Other solvents, such as toluene, are suitable. Both the acid and solvent pass to the atmosphere during processing.

As previously mentioned, the method comprises three basic steps. One step is directed to the application of the unique formulation. The formulation is deposited upon a surface of a taut substrate, which continuously passes beneath the point of deposition. The formulation can be applied to one or both sides of the substrate. However, application to one side is preferred. Multiple depositions or coatings are within the purview of the subject invention. A conventional floating doctor blade, having a thickness of about 0.25 to 0.40, is used to uniformly spread the formulation across the width of the substrate. Thereafter the substrate and deposited formulation are cured in an oven having a temperature of about 300° F. That conventional oven may have two stages with the first stage at 300° F., while the second stage is at 325° F. The purpose of the first mentioned step is to impart both wind-resistant and water-repellency to the finished substrate.

The viscosity of the formulation is typically between about 20,000 to about 100,000 centipoise as measured with a Brookfield Viscometer. A preferred range of viscosity is between about 20,000 and about 40,000 centipoise. If the viscosity is lower than 20,000 centipoise, the formulation will run through the substrate and stiffen it. If the viscosity is higher than about 100,000 centipoise, it becomes difficult to uniformly coat the surface of and penetrate the substrate.

Another step in the method comprises padding the substrate in a bath containing a silicone or a fluorocarbon solution along with the attendant removal of excess solution. Typical silicone and fluorocarbon solutions appear below:

| Silicone Solution | | |
|---|---|---|
| Trade Name | Chemical Composition | Concentration Percent by Weight |
| Water | H$_2$O | 56.0 |
| Perma Fresh 114B (Sun Chemical Co.) | Modified Glyoxal Resin | 15.0 |
| Acetic Acid (56%) (Taylor Chemical) | Acetic Acid | 0.5 |
| Isopropanol (Taylor Chemical) | Alcohol | 4.0 |
| Relpel SS (Reliance Chemical) | Silicone Emulsion | 12.0 |
| Catalyst SS (Reliance Chemical) | Zinc Stearate | 6.0 |
| Catalyst X-4 (Sun Chemical Co.) | Zinc Nitrate | 4.5 |
| Cyanalube TS-1 | Polyethylene Emulsion | 2.0 |
| | | 100.0 |

| Fluorocarbon Solution | | |
|---|---|---|
| Trade Name | Chemical Composition | Concentration Percent by Weight |
| Water | H$_2$O | 67.4 |
| Mykon NRW-3 (Sun Chemical Co.) | Fatty Acid Amine Condensate | 0.1 |
| Cyanalube TS-1 (American Cyanamid) | Polyethylene Emulsion | 2.0 |
| Perma Fresh 114B (Sun Chemical Co.) | Modified Glyoxal Resin | 15.0 |
| Catalyst X-4 (Sun Chemical Co.) | Zinc Nitrate | 4.0 |
| Acetic Acid (56%) (Taylor Chemical) | Acetic Acid | 0.5 |
| Nalan W (DuPont) | Thermosetting Resin Condensate | 5.5 |
| Zepel D (Reg) (DuPont) | Fluorocarbon Derivative | 5.5 |
| | | 100.0 |

A very thin coat of either solution is applied and produces an add-on weight to the finished product of about 0.05 to about 0.1 oz./square yard. The solution is dried for three minutes at about 250° F. and cured for about two minutes at 340° F. This other procedure can be applied either before or after application of the first step. If the solution is applied prior to the application of the formulation, a silicone solution is preferred. The purpose of this padding technique is to impart greater water-repellency to the substrate. The substrate is padded on both of its sides.

The last step in the method comprises compressing the substrate. For example, if a fabric is used, it is compressed or shrunk by conventional techniques about 1/10 of 1% in its width. Its length is compressed by a similar amount. The purpose of this step is to give the treated substrate a suitable handle.

The add-on weight to the substrate, after application of the method just described, should be between about 0.4 to about 0.8 oz./square yard. Significant is the fact that present invention is directed to coating fibers rather than coating the surface of a substrate constructed from these fibers.

Typical substrates used in the subject of the invention are polyester-cotton combinations at various percent mixtures, natural fiber fabrics, synthetic materials, and combinations of natural and synthetic materials. Some fabrics are not acceptable, such as canvas and taffeta. The density of such fabrics varies between about 3.0 to about 6.0 oz./square yard. The fabric must be closely woven or tight, that is, have a thread count of at least about 90 threads per inch in the warp and at least about 68 threads per inch in the weft or fill. A typical fabric would have a thread count of 106×70 threads per inch, i.e. warp×weft. A thread count less than those noted above allows the formulation to pass through the substrate.

EXAMPLES

The following examples illustrate the formulation, method of application and a product of the present invention. Although manufacture of rainwear material is described below, that manufacture is merely illustrative of the preferred product and is not considered to limit the present invention.

A number of formulations are described in the examples. The initial viscosity of each formulation is about 20,000 centipoise. The physical properties of the rainwear material manufactured in each example are also described. Several properties were evaluated, but each property pertains to characteristics essential for outerwear clothing that repels rain. A brief discussion of the most important of these follows along with the procedure used to evaluate the property.

Probably the most important of these tests is the Rain Test which measures the resistance of fabrics to penetration of water. A typical testing apparatus comprises an eight-foot water column which is connected to a spray nozzle facing a test sample that is stretch over a hoop. The specimen is backed by a weighed blotter and is sprayed for five minutes. Thereafter, the blotter is again weighed to ascertain any increase in weight caused by penetration of water through the sample. An increased weight of five grams is acceptable. An increased weight of about one gram is excellent.

Another test used to check rainwear is the Hydrostatic Pressure Test, sometimes called the Suter Test. It measures the resistance of fabrics to the penetration of water under static pressure such as that found in a driving rain. A water column is used; and like the Rain Test, water impinges on a sample stretched over a hoop. The first few drops of water penetrating the fabric signals completion of the test. The result is reported to the nearest centimeter of water column height.

Water vapor transmission is determined by using a special metal cup into which is measured about 90 mls of distilled water. The test sample is clamped over the cup and the level of the water is within about 20 mm of the fabric sample. The apparatus, including cup, water and sample, is weighed. After 24 hours in a conditioned atmosphere, the cup is re-weighed to determine loss of water which penetrated the sample. The data is reported in grams/hr./square meter. A number of 25–35 is considered ideal.

EXAMPLE I

A polyester-cotton fabric having a thread count of 106 threads per inch by 70 threads per inch was tested. The fabric sample was processed according to the method detailed above. Specifically, a formulation was deposited on the sample. The formulation comprised:

| Component | Concentration Percent by Weight |
|---|---|
| Poly Dimethyl Siloxane | 99.5 |
| Dibutyl Tin Diacetate | 0.5 |
|  | 100.0 |

That formulation was deposited on the fibrous substrate and evenly spread over one of its surfaces. The sample was then cured at about 300° F. Then the sample was padded with the fluorocarbon composition described in detail above. Excess solution was removed. The sample was dried for about three minutes at 250° F. and then cured for about two minutes at 340° F. That sample was then compressively shrunk using the conventional technique described above. The finished product containing multicoated fibers was analyzed. Pertinent physical properties are described below:

| Test | Value |
|---|---|
| Handle | Excellent |
| Rain Test | 0.212 grams |
| After 3 Washing Cycles | 0.315 grams |
| After 3 Dry-cleaning Cycles | 0.904 grams |
| Hydrostatic Pressure Test | 49 centimeters |
| Water Vapor Transmission Test (65% Relative Humidity) | 15.6 gm./hr./sq.m. |

EXAMPLE II

Example I was repeated except the formulation differed:

| Component | Concentration Percent by Weight |
|---|---|
| Poly Dimethyl Siloxane | 98.5 |
| Butyl Tin Diacetate | 0.5 |
| Glacial Acetic Acid | 1.0 |
|  | 100.0 |

The physical properties of the resulting product were:

| Test | Value |
|---|---|
| Handle | Excellent |
| Rain Test | 0.63 grams |
| After 3 Washing Cycles | 0.74 grams |
| After 3 Dry-cleaning Cycles | 1.14 grams |
| Hydrostatic Pressure Test | 36.4 centimeters |
| Water Vapor Transmission Test (65% Relative Humidity) | 16.4 gm./hr./sq.m. |

EXAMPLE III

Example II was repeated except that the concentration of the acetic acid was reduced. The formulation appears below:

| Component | Concentration Percent by Weight |
|---|---|
| Poly Dimethyl Siloxane | 99.0 |
| Dibutyl Tin Diacetate | 0.5 |
| Glacial Acetic Acid | 0.5 |
|  | 100.0 |

The physical properties of the product resulting from using the above formulation was substantially identical to those obtained in Example II. The decrease in the concentration of acetic acid merely decreased the shelf life of the formulation and increased its viscosity all in relation to the formula used in Example II.

EXAMPLE IV

Example II was again repeated except that a different catalyst was used. The formulation appears below:

| Component | Concentration Percent by Weight |
|---|---|
| Poly Dimethyl Siloxane | 98.3 |
| Dibutyl Tin Dilaurate | 0.7 |
| Glacial Acetic Acid | 1.0 |
|  | 100.0 |

The physical characteristics of the product manufactured using this formulation were substantially identical to those of Example II.

EXAMPLE V

Example II was repeated on a commercial scale. Approximately 120 yards of sample were processed. Formula used was as follows:

| Component | Concentration Percent by Weight |
|---|---|
| Poly Dimethyl Siloxane | 98.3 |
| Dibutyl Tin Dilaurate | 0.7 |
| Glacial Acetic Acid | 1.0 |
| | 100.0 |

The physical characteristics of the product are as follows:

| Test | Value |
|---|---|
| Handle | Excellent |
| Rain Test | 0.28 grams |
| After 3 Washing Cycles | 0.27 grams |
| After 3 Dry-cleaning Cycles | 1.20 grams |
| Hydrostatic Pressure Test | 43.0 centimeters |
| Water Vapor Transmission Test (65% Relative Humidity) | 14.5 gm./hr./sq.m. |

EXAMPLE VI

This example utilizes the preferred formulation of the subject invention. Example I was repeated except that the fabric was padded with a silicone solution described in detail above instead of the fluorocarbon solution. This example was operated at a commercial scale with approximately 6000 yards of fabric being manufactured. The formulation used in this commercial scale operation was:

| Component | Concentration Percent by Weight |
|---|---|
| Poly Dimethyl Siloxane | 95.3 |
| Dibutyl Tin Dilaurate | 0.7 |
| Glacial Acetic Acid | 1.0 |
| Xylol | 3.0 |
| | 100.0 |

The physical properties of the commercial product described above were as follows:

| Test | Value |
|---|---|
| Handle | Excellent |
| Rain Test | 2.5 grams |
| After 3 Washing Cycles | 2.5 grams |
| After 3 Dry-cleaning Cycles | 2.5 grams |
| Hydrostatic Pressure Test | 25 centimeters |
| Water Vapor Transmission Test (65% Relative Humidity) | 13 gm./hr./sq.m. |

It is not intended to limit the present invention to the specific embodiments described above. It is recognized that other changes may be made in the formulation and method of application specifically described herein without deviating from the scope and teaching of the present invention. It is intended to encompass all other embodiments, alternatives, and modifications consistent with the present invention.

We claim:
1. A process for coating substrates characterized by:
   (a) depositing on a taut substrate a composition comprising
   (1) a poly dimethyl siloxane being present in an amount about 95.3 percent by weight of the composition,
   (2) a dibutyl tin dilaurate catalyst being present in an amount about 0.7 percent by weight of the composition,
   (3) acetic acid being present in an amount about 1.0 percent by weight of the composition, and
   (4) an aromatic solvent being present in an amount about 3.0 percent by weight of the composition, or (1) a poly dimethyl siloxane being present in an amount from about 93 to about 99% by weight of the composition, and
   (2) a tin catalyst being present in an amount from about 0.5 to about 1.5% by weight of the composition,
   (b) uniformly distributing the deposited composition on one surface of the substrate,
   (c) curing the substrate from (b),
   (d) padding the substrate with a solution selected from a silicone or a fluorocarbon solution, and
   (e) compressing the substrate whereby it is substantially wind-resistant, water-repellent and has a good handle.

2. The process of claim 1 further characterized in that the substrate is padded before the composition is deposited thereon.

3. The process of claim 1 further characterized in that the composition is deposited on both sides of the substrate.

4. The process of claim 1 further characterized in that the substrate is a closely woven fabric.

5. The process of claim 4 further characterized in that the fabric has a warf of at least about 90 and a weft of at least about 68.

6. The process of claim 4 further characterized in that the substrate is a blend of polyester and cotton.

7. A product from the process of claim 1.

8. A process for coating a woven fabric comprising the steps of:
   (a) Depositing on a taut fabric a coating composition having a viscosity up to about 100,000 cps and consisting essentially of:
   1. a dimethyl siloxane component present in an amount from about 93 to 99 percent by weight of the composition, and
   2. a tin catalyst present in an amount from about 0.5 to about 1.5 percent by weight of the composition,
   (b) uniformly distributing the deposited coating composition on the surface of the fabric,
   (c) curing the fabric from b, and
   (d) padding the fabric with a solution selected from a silicone or a fluorocarbon solution, whereby the fabric is substantially wind-resistant and water-repellent.

9. The process of claim 8 wherein the padding of the fabric is accomplished before the coating composition is deposited thereon.

10. The process of claim 8 wherein the composition is deposited on both sides of the fabric.

11. The process of claim 8 wherein the fabric is a closely woven fabric.

12. The process of claim 11 wherein the fabric has a warf of at least about 90 and a weft of about 68.

13. The process of claim 11 wherein the fabric is a blend of polyester and cotton.

14. The process of claim 8 wherein the composition deposited on the substrate consists essentially of:

1. a dimethyl siloxane component present in the amount of about 90.3 percent by weight of the composition; and
2. a dibutyl tin dilaurate catalyst being present in an amount of about 0.7 percent by weight of the composition.

15. The process of claim 8 wherein the coating composition deposited on the fabric further contains:
3. acetic acid being present in an amount of about 1.0 percent by weight of the composition.

* * * * *